United States Patent
Toyazaki

(10) Patent No.: US 8,643,881 B2
(45) Date of Patent: Feb. 4, 2014

(54) APPARATUS AND METHOD OF CONTROLLING AN IMAGE FORMING APPARATUS BASED ON THE PRINT SPEED OF PRINT JOBS

(75) Inventor: Shigeru Toyazaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 474 days.

(21) Appl. No.: 13/042,581

(22) Filed: Mar. 8, 2011

(65) Prior Publication Data
US 2011/0228324 A1 Sep. 22, 2011

(30) Foreign Application Priority Data

Mar. 17, 2010 (JP) .................................. 2010-060843
Feb. 14, 2011 (JP) .................................. 2011-028198

(51) Int. Cl.
*G06F 3/12* (2006.01)
(52) U.S. Cl.
USPC ........... 358/1.15; 358/1.2; 358/1.9; 358/1.13; 358/1.16; 358/1.17; 358/1.18; 358/426.02; 382/239; 382/240; 382/166; 382/232; 382/243
(58) Field of Classification Search
None
See application file for complete search history.

(56) References Cited

U.S. PATENT DOCUMENTS

| | | | | |
|---|---|---|---|---|
| 5,107,339 A | * | 4/1992 | Bertoni et al. | 358/296 |
| 2007/0058191 A1 | * | 3/2007 | Harigae | 358/1.15 |
| 2008/0186530 A1 | * | 8/2008 | Kurozasa | 358/1.15 |
| 2008/0256541 A1 | * | 10/2008 | Rai | 718/101 |
| 2011/0188062 A1 | * | 8/2011 | Sweet et al. | 358/1.13 |
| 2012/0075662 A1 | * | 3/2012 | Giannetti | 358/1.15 |
| 2012/0176645 A1 | * | 7/2012 | Saito | 358/1.15 |

FOREIGN PATENT DOCUMENTS

| | | |
|---|---|---|
| JP | 2004-216799 | 8/2004 |
| JP | 3721612 | 9/2005 |

* cited by examiner

*Primary Examiner* — Miya J Cato
(74) *Attorney, Agent, or Firm* — Oblon, Spivak, McClelland, Maier & Neustadt, L.L.P.

(57) ABSTRACT

An apparatus and method of controlling data to be processed by an image forming system encode image data to be printed to generate code data, and code information regarding encoding processing or the code data. The code information is used to obtain a predicted decode time, and a print speed level at which decoded data is to be printed. A plurality of print jobs to be processed are re-arranged by the print speed level to generate a print job sequence.

7 Claims, 14 Drawing Sheets

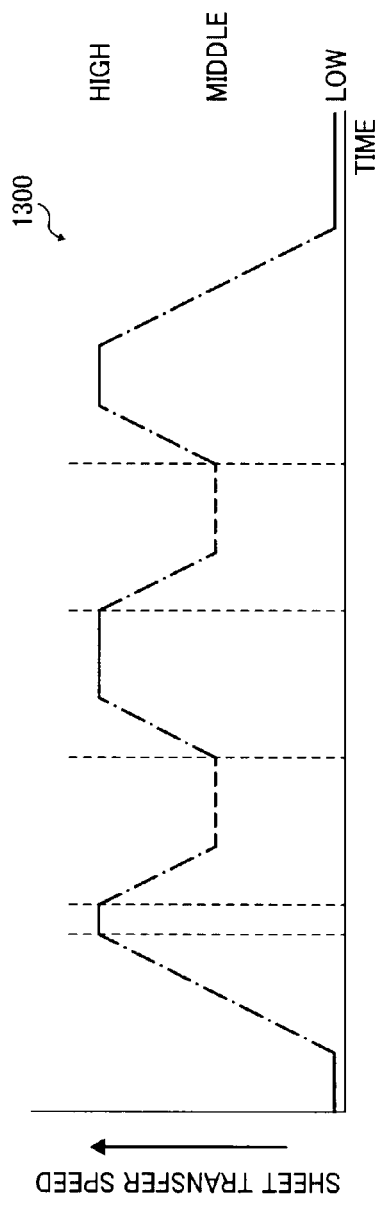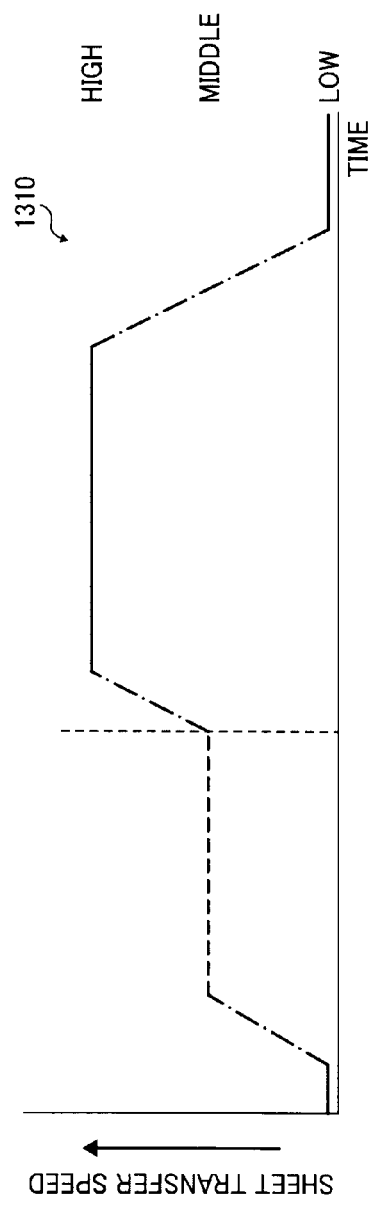

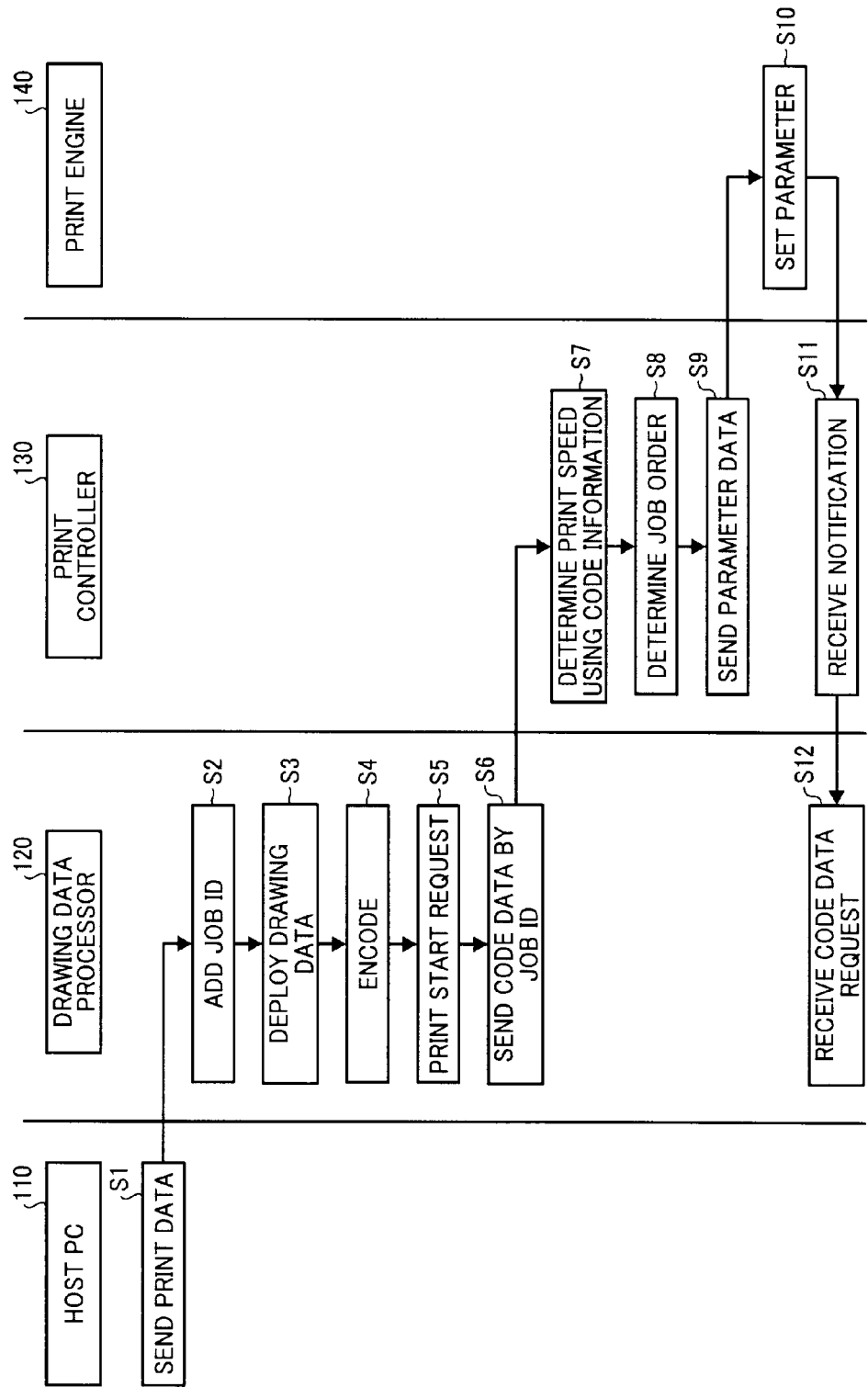

APPARATUS AND METHOD OF CONTROLLING AN IMAGE FORMING APPARATUS BASED ON THE PRINT SPEED OF PRINT JOBS

CROSS-REFERENCE TO RELATED APPLICATIONS

This patent application is based on and claims priority pursuant to 35 U.S.C. §119 to Japanese Patent Application Nos. 2010-060843, filed on Mar. 17, 2010, and 2011-028198, filed on Feb. 14, 2011, in the Japanese Patent Office, the entire disclosure of which is hereby incorporated herein by reference.

FIELD OF THE INVENTION

The present invention generally relates to an apparatus, method, and a system of controlling image data to be processed by an image forming apparatus, and more specifically to an apparatus, method, and a system of controlling an order of processing image data to be processed by an image forming apparatus.

BACKGROUND

In the tandem-type image forming apparatuses such as copiers or printers that form a color image, image forming devices of respective colors are disposed side by side to form images of respective colors on an image carrier. The images of respective colors are transferred from the image carrier onto a recording sheet one above the other to form a color composite image. In operation, the tandem-type image forming apparatuses transfer image data of respective colors through a network or an interface between devices, or write in or read out image data of respective colors to or from a memory. In order to increase efficiency in image data transfer or image data storage, the image data of respective colors may be each encoded.

In such case, the image forming apparatuses need to decode the image data by the time when a recording sheet is transferred to an image transfer section. If the decoded image data is not available by then, the image forming apparatuses may need to control a sheet transfer device to transfer the recording sheet at lower speeds or hold operation of transferring the recording sheet, for example, as described in Japanese Patent Application Patent No. 3721612. This, however, increases the overall processing time required for printing, especially when a large number of images are to be successively formed.

SUMMARY

Example embodiments of the present invention include an apparatus, method, system, computer program and product each capable of controlling data to be processed by an image forming system. The image data to be printed by the image forming system is encoded to generate code data, and code information regarding encoding processing or the code data. The code information is used to obtain a predicted decode time, and a print speed level at which decoded data is to be printed. A plurality of print jobs to be processed by the image forming system are re-arranged by the print speed level to generate a print job sequence.

In addition to the above-described example embodiments, the present invention may be practiced in various other ways.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 13A is a graph illustrating the change in print speeds with respect to time, when performing a plurality of print jobs, without performing a function of determining a print job sequence;

FIG. 13B is a graph illustrating the change in print speeds with respect to time, when performing a plurality of print jobs;

FIGS. 14 and 15 are a data sequence diagram illustrating operation of printing image data, performed by the print system of FIG. 1, according to an example embodiment of the present invention;

Figure 1A:
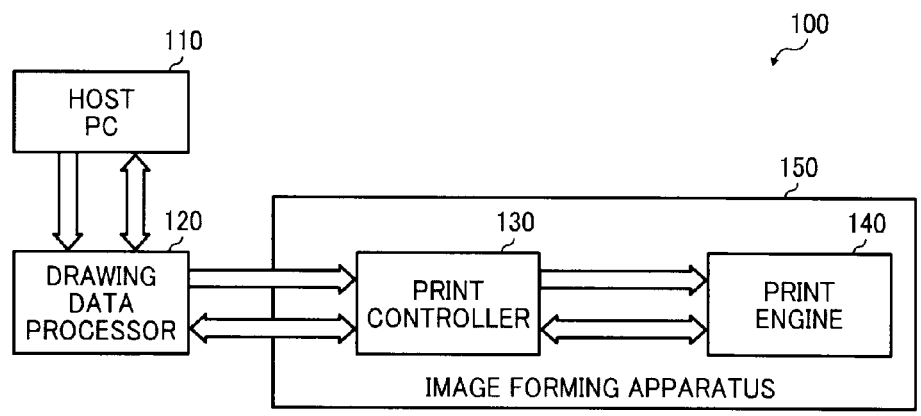
FIGS. 1A and 1B are schematic block diagrams each illustrating a configuration of a printing system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following examples, an image forming apparatus that forms an image using the ink jet method is explained. Alternatively, an image forming apparatus of any desired type, such as an image forming apparatus that forms an image using electrophotographic method, may be implemented to perform a method or a function of controlling data to be processed as described below. Further, in this example, it is assumed that the image forming apparatus forms an image on continuous roll paper. Alternatively, any desired recording sheet may be used such as cut paper.

Figure 1B:
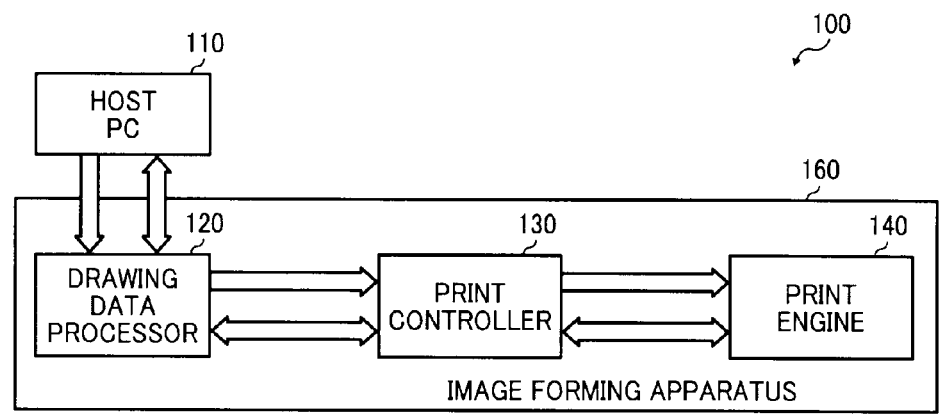

Referring to FIGS. 1A and 1B, example configurations of a print system 100 are explained. Referring to FIGS. 1A and 1B, the print system 100 includes a host personal computer (PC) 110, a drawing data processor 120, a print controller 130, and a print engine 140. Referring to FIG. 1A, in one example, the print controller 130 and the print engine 140 are incorporated into one apparatus to form an image forming apparatus 150. The drawing data processor 120 is implemented as a server apparatus that is connected with the host PC 110 and the image forming apparatus 150 through a network. The image forming apparatus 150 receives data to be printed, which is deployed and coded by the drawing data processor 120, and prints an image on a recording sheet based on the received data.

In another example, as illustrated in FIG. 1B, the drawing data processor 120, the print controller 130, and the print engine 140 are incorporated into one apparatus to form an image forming apparatus 160. The image forming apparatus 160 may be implemented as a multifunctional apparatus (MFP) capable of performing a plurality of functions including the functions of encoding and decoding print data received from the host PC 110.

The host PC 110 edits or manages various data such as document data or image data. When the host PC 110 receives a user instruction for printing data, the host PC 110 sends data to be printed ("print data") to the drawing data processor 120 to cause the drawing data processor 120 to generate raster data based on the print data.

The drawing data processor 120 receives the print data from the host PC 110, and executes a print processor and a printer spooler to generate raster data from the print data in a desired format such as Enhanced Meta-File (EMF), PDF, PostScript, etc. The drawing data processor 120 encodes the raster data using a desired compression method to generate code data, and sends the code data to the print controller 130. In this manner, data transfer rate in transferring data to be processed is improved.

The print controller 130 decodes the code data received from the drawing data processor 120 to obtain the uncompressed raster data, and sends the raster data to the print engine 140. In this example, the print engine 140 prints images, page by page, onto continuous roll paper using the ink jet method. The print system 100 may be additionally provided with a post processing device to perform the process of cutting the roll paper into a plurality of sheets, sorting the printed sheets, or stapling the printed sheets. The post processing device may be incorporated into the print engine 140 or may be provided separately from the print engine 140.

In this example, the host PC 110 is implemented as a computer apparatus of any desired type such as a personal computer, workstation, or server. The host PC 110 includes a microprocessor having a CISC architecture provided with a PENTIUM or PENTIUM-compatible chip, or a microprocessor having a RISC architecture such as PowerPC, in the form of single-core or multiple-core. Further, the host PC 110 is controlled under an operating system such as Windows 200X, UNIX, or LINUX. The host PC 110 executes an application program that is written in any desired programming language such as C, C++, or JAVA. In operation, the host PC 110 generates print data for further processing. Assuming that WYSIWYG is implemented, the Windows OS having Graphical Display Interface (GDI) is preferably used.

The drawing data processor 120 receives the print data from the host PC 110, and assigns a specific job ID to the print data. The drawing data processor 120 further causes the print processor and spooler to convert the print data to raster data. The drawing data processor 120 may be incorporated into one of the functions of the print controller 130. In this example, however, the drawing data processor 120 is provided separately from the print controller 130. This is partly because the drawing data processor 120 consumes a relatively large portion of hardware resource in printing process, while affecting the overall printing speeds of the printing system 100. The drawing data processor 120 may be implemented as any desired computer apparatus such as a personal computer, work station, or server. The drawing data processor 120 generates the raster data, and codes the raster data in any desired format to improve the data transfer rate in transferring data to the print controller 130. Examples of coding formats include, but not limited to, GIF, JPEG, JPEG2000, TIFF, JBIG, and PNG.

For the descriptive purposes, in the following examples, it is assumed that JPEG is used to code raster data. JPEG is described in ITU-T Recommendation T.81 as a technique to compress a still image. More specifically, JPEG coding compresses a raster image using an encoder to perform splitting the image into blocks, applying discrete cosine transform (DCT), quantizing, applying Huffman coding, etc. The code data is decoded using a decoder that performs the above-described process in a reverse direction. When JPEG coding is to be used, time required for decoding can be predicted based on time required for coding or code information such as a size of code data. In alternative to JPEG coding, time required for decoding may be predicted based on information obtainable from coding such as time required for coding, as long as the coding process and the decoding process are basically reversible.

The drawing data processor 120 sends the code information to the print controller 130. The print controller 130, which receives the code information, calculates a predicted decode time that is predicted to be required for decoding the code data using the code information. The print controller 130 determines a job sequence indicating the order of processing a plurality of jobs, using the predicted decode time that is calculated for each job. According to the determined job sequence, the print controller 130 assigns an index, or a job order, to each job having the job ID assigned. In the determined job order, the print controller 130 obtains code data using the job ID, and decodes the code data to obtain uncompressed raster data. The printer controller 130 sends the raster data to the print engine 14 in the order determined by the job sequence.

The print engine 140 generates an engine drive signal according to the received raster data to drive a print head and a sheet transfer mechanism to print the images based on the raster data on continuous roll paper. Especially, in case of sequentially printing images on continuous roll paper, the job sequence is most likely to affect the transfer rate or speed of paper.

Figure 2:
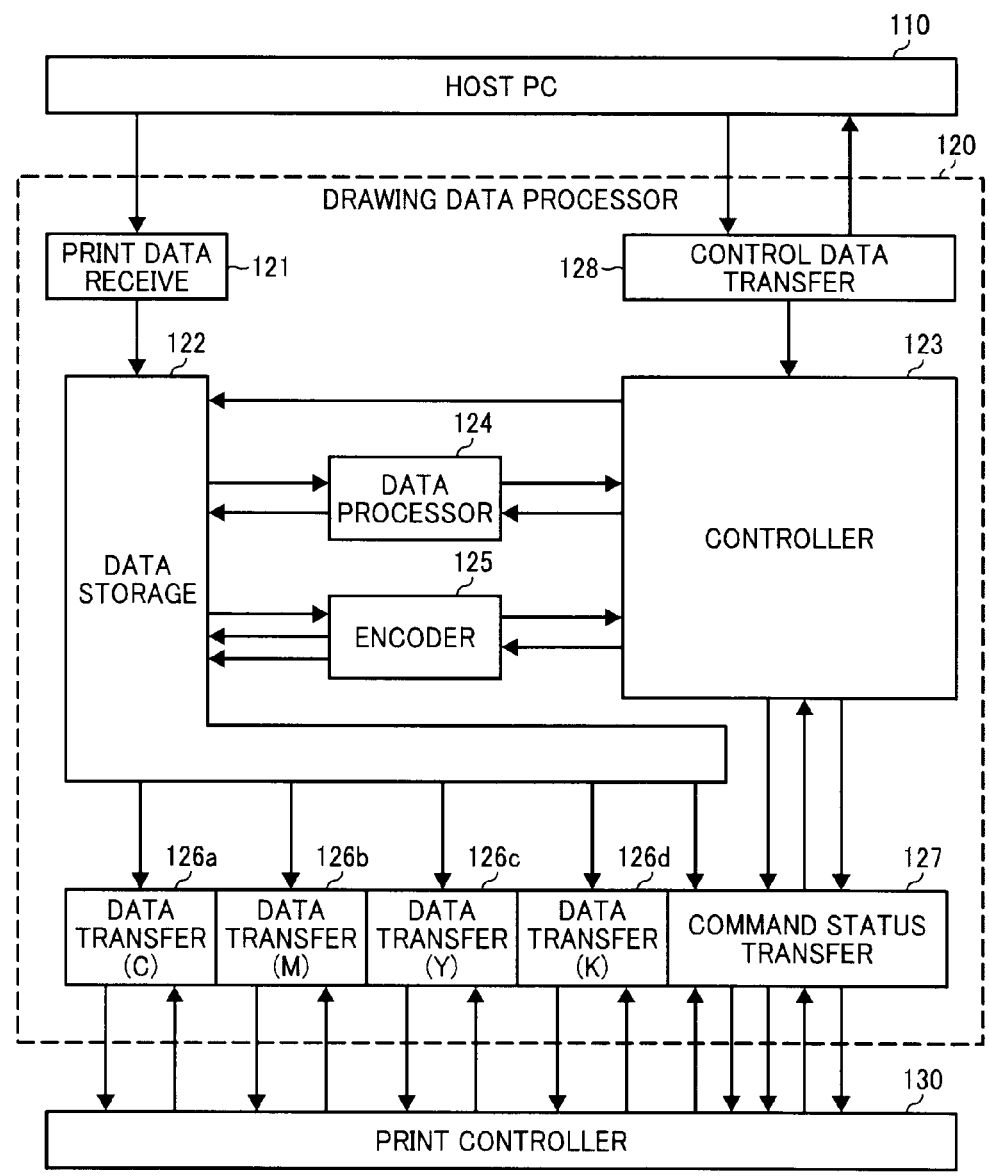
FIG. 2 is a schematic block diagram illustrating a functional structure of a drawing data processor of the printing system of FIG. 1.

FIG. 2 illustrates a functional block of the drawing data processor 120 of the print system 100. The drawing data processor 120 includes a print data receive 121, a data storage 122, a controller 123, a data processor 124, an encoder 125, data transfers 126a to 126d, a command status transfer 127, and a control data transfer 128. The print data receive 121 receives the print data from the host PC 110, and stores the print data in the data storage 122. The data storage 122 may be implemented by an image RAM. The control data transfer 128 sends notification to the host PC 110 to notify a print status for each job to indicate whether printing is in progress, image forming process of printing is completed, or output process of printing is completed. Further, the control data transfer 128 exchanges various parameters regarding printing such as a sheet size to be printed or margins, or parameters regarding post-processing such as whether to cut paper, or whether to perform stapling, etc. In this example, information regarding fonts to be used for printing is included in the print data.

The data storage 122 stores the print data. The data storage 122 further stores the raster data generated by the drawing data processor 124 in a buffer, and sends the raster data to the encoder 125 for coding. The data processor 124 obtains the print data, which is buffered, and calls a print processor and a spooler to generate the raster data by causing the printer processor and the spooler to repeat operations of processing and spooling until all pages of image included in the print data are processed. The resultant raster data is sent to the data storage 122 for further processing by the encoder 125.

In this example, the encoder 125 is a JPEG encoder that reads out the raster data, and performs JPEG coding to the raster data including splitting into blocks, applying DCT, quantizing, and applying Huffman coding. At the time, the encoder 125 obtains code information that is obtainable through coding, and stores the code information in the data storage 122.

The controller 123 controls entire operation of the drawing data processor 120. The controller 123 may be implemented by a portion of the CPU of the drawing data processor 120 or a graphic processor. The code data is buffered in the data storage 122 until a request for code data is received from the print controller 130. The controller 123 sends the control data received through the control data transfer 128, code information that is obtained through buffering, and a specific job ID, to the command status transfer 127 for further processing by the print controller 130.

The data transfers 126a to 126d each control reading of code data from the data storage 122 and writing of code data to the print controller 130, according to a request received from the print controller 130. The command status transfer 127 buffers the code data, job ID, and various parameters, and sends the buffered data to the print controller 130 according to a request received from the print controller 130. Further, the command status transfer 127 sends or receives notification regarding a print status indicating whether printing is in progress, image forming process of printing is completed, or output process of printing is completed.

Figure 3:
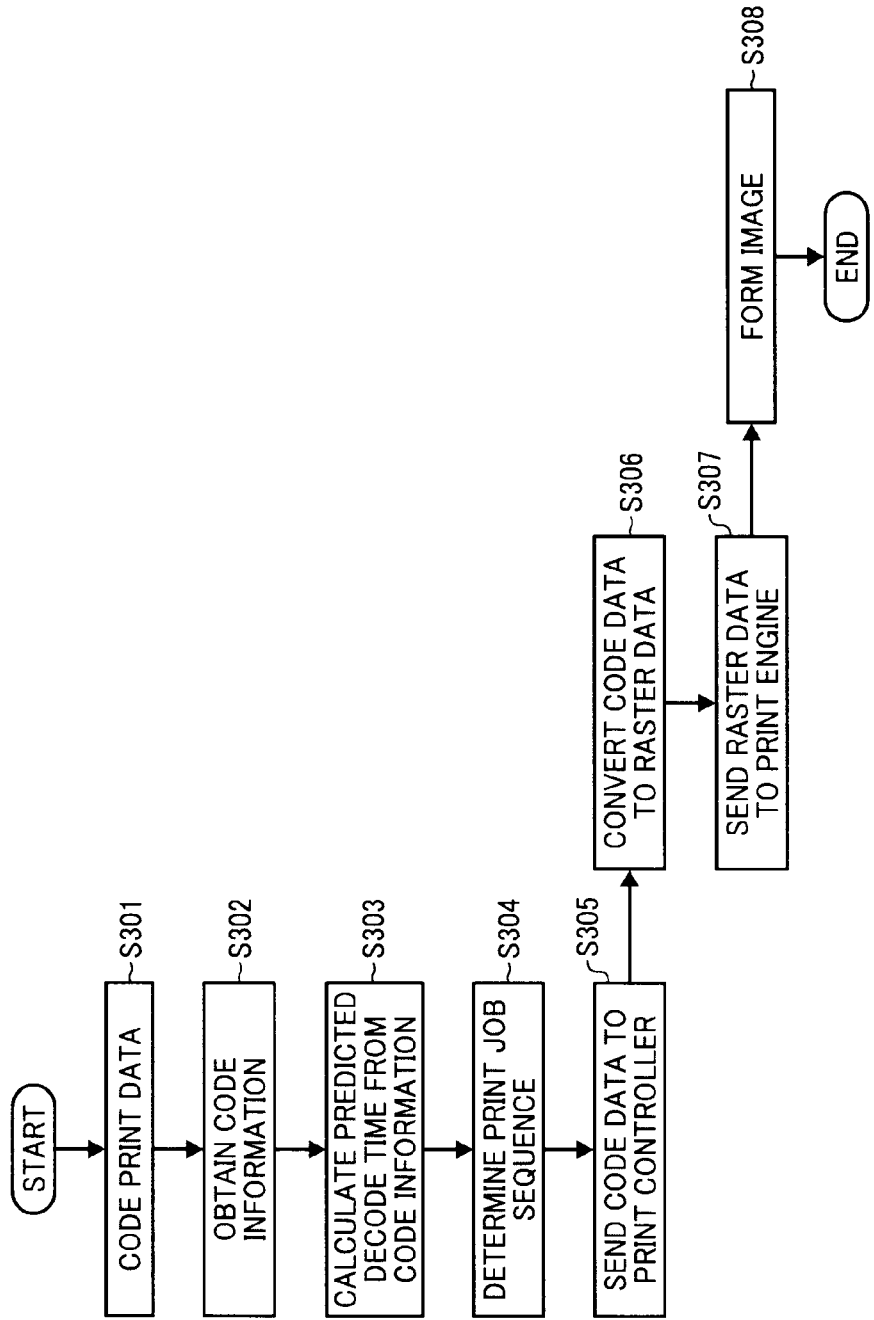
FIG. 3 is a flowchart illustrating operation of printing image data, performed by the printing system of FIG. 1, according to an example embodiment of the present invention.

FIG. 3 is a flowchart illustrating operation of printing an image based on print data, performed by the drawing data processor 120, the print controller 130, and the print engine 140, according to an example embodiment of the present invention.

At S301, the drawing data processor 120 encodes the print data received from the host PC 110. At S302, the print controller 130 obtains code information regarding the coding process or code data, such as a size of code data and encoding format, from the drawing data processor 120. At S303, the print controller 130 calculates the predicted decode time required for decoding the code data using the code information.

At S304, the print controller 130 determines a print job sequence. For example, the print controller 130 sorts the order of jobs either from the highest to the lowest or from the lowest to the highest of the predicted decode time obtained for code data of each job. At S305, the print controller 130 requests the drawing data processor 120 to send the code data to the print controller 130 according to the determined job sequence.

At S306, the print controller 130 receives the code data from the drawing data processor 120, and deploys the code data into raster data. At S307, the print controller 130 sends the raster data generated at S306 to the print engine 140 to start driving the print engine 140.

At S308, the print engine 140 generates an engine drive signal from the raster data. The engine drive signal is used for controlling various hardware resources of the print engine 140 such that these resources operate in synchronization with one another. More specifically, the print engine 140 drives an image forming device such as the ink head, laser diode, or polygon mirror, and the sheet transfer mechanism to perform printing, and the operation ends.

In this example, the print engine 140 may send notification regarding the status of printing to indicate whether printing is started or printing is completed to the host PC 110.

Figure 4:
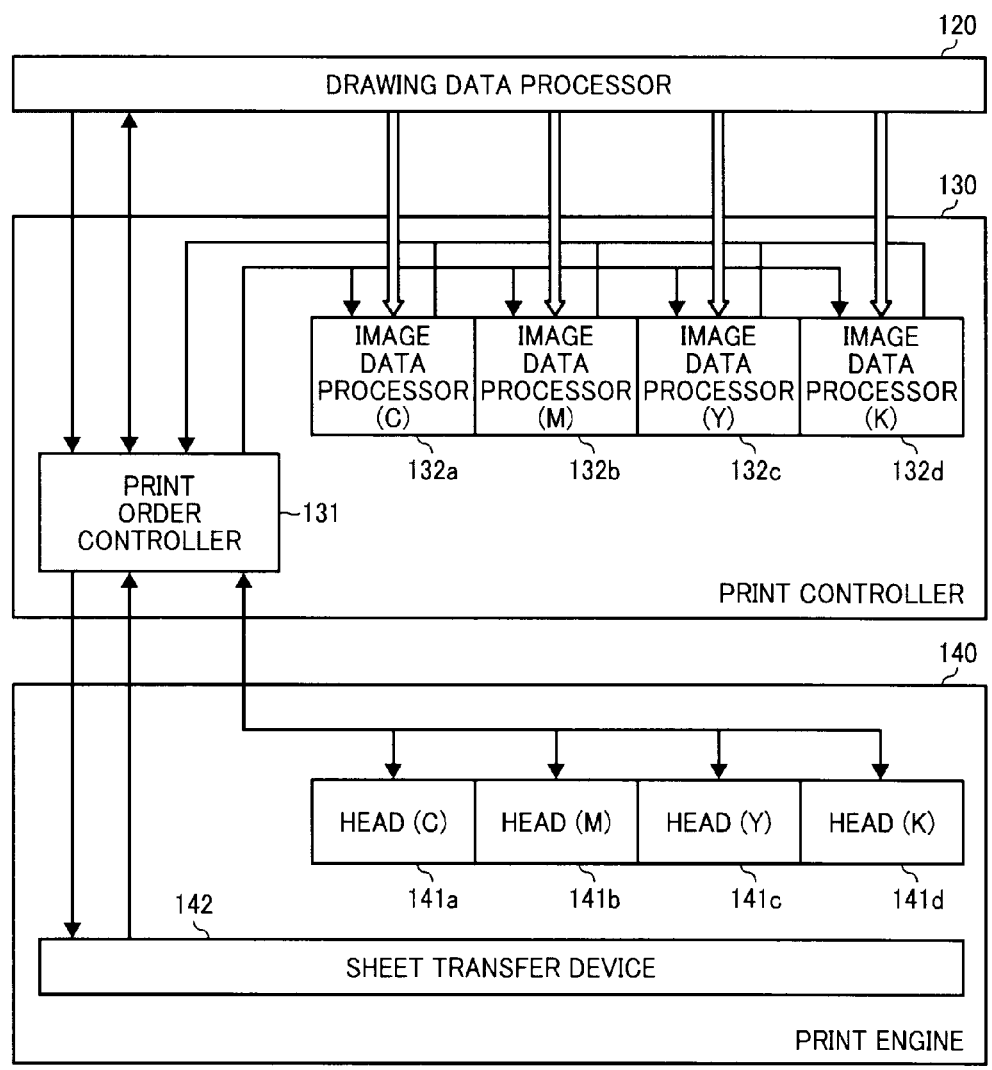
FIG. 4 is a schematic block diagram illustrating a functional structure of a print controller and a print engine of the printing system of FIG. 1.

FIG. 4 illustrates a functional block of the print controller 130 and the print engine 140. In this example, the print controller 130 determines a job sequence of a plurality of jobs to be processed as well as a print speed for each job, and sends raster data for processing according to the determined job sequence and the print speed to control operation of the print engine 140. The print controller 130 includes a print order controller 131, and image data processors 132a to 132d. The print order controller 131 predicts the decode time using the code information received from the drawing data processor 120 to obtain the predicted decode time, and determines a print speed based on the predicted decode time.

In this example, the predicted decode time may be calculated using a function of coding information such as the time required for coding or a size of code data. In this specification, the code information refers to any desired information that is obtainable during the coding process including, for example, the coding speed, the size of code data, an amount of coding, and a number of coded symbols. Further, while taking account a specific coding technique that is applied, the time required for decoding can be predicted based on the code information. For example, a function of coding information may be used, which calculates the predicted decode time to be equal to the time required for coding. Alternatively, a function of coding information, which is more complex, may be used based on various code information such as time required for coding or an amount of coding, depending on a machine type or processing capability of the print controller 130.

The image data processors 132*a* to 132*d* each decode the code data received from the drawing data processor 120 to generate raster data of respective colors. The rater data is sent to the print engine 140 by a job ID, according to the job sequence determined by the print order controller 131. The print engine 140 drives heads 141*a* to 141*d*, each corresponding to a specific color, to print images of respective colors. In this example, the heads 141*a* to 141*d* are arranged side by side to have a tandem structure. The print order controller 131 sends a print speed signal indicating the determined print speed to the sheet transfer device 142 to cause paper to be transferred in synchronization with the heads 141*a* to 141*d*. Further, as illustrated in FIG. 4, the sheet transfer device 142 transfers paper in the direction indicated by the arrow.

Figure 5:
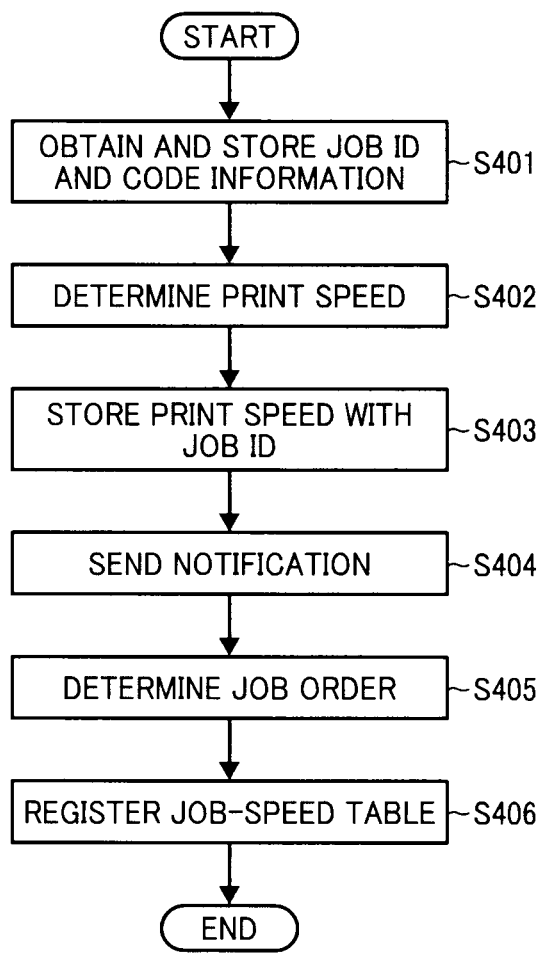
FIG. 5 is a flowchart illustrating operation of determining a printing order, performed by a print order controller of FIG. 4, according to an example embodiment of the present invention.

FIG. 5 is a flowchart illustrating operation of determining a job sequence, performed by the print order controller 131, according to an example embodiment of the present invention. The operation of FIG. 5 is performed when the print controller 130 receives notification indicating operation of printing image data is to be started from the drawing data processor 120. Further, in this example, it is assumed that the drawing data processor 120 assigns a specific job ID to the code data as well as the code information obtained through processing the code data, when generating the code data.

At S401, the print controller 130 obtains the job ID and the code information from the drawing data processor 120, and stores the job ID and the code information in a data storage in a corresponding manner. At S402, the print order controller 131 receives an instruction for determining a print speed, and refers to a look-up table (LUT) to obtain a print speed level that corresponds to the predicted decode time calculated from the code information.

At S403, the print order controller 131 stores the print speed obtained at S401 in the data storage in association with the job ID. At S404, the print order controller 131 sends notification indicating that determination of the print speed is completed. At S405, the print order controller 131 determines a print order according to the print speed by sorting a plurality of jobs using the job ID in the order determined by the print speed to generate a job sequence table. At S406, the print order controller 131 registers a job-speed table, and the operation ends.

Figure 6:
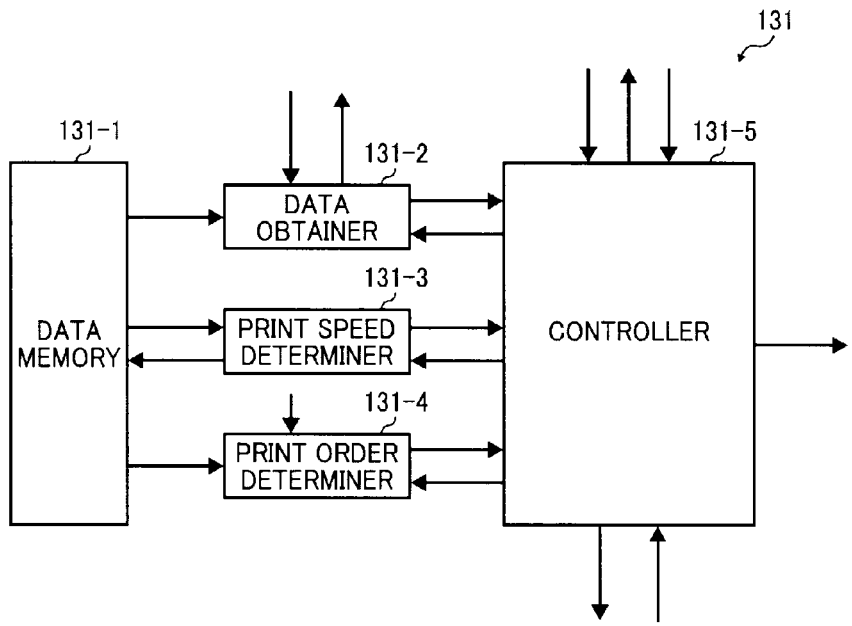
FIG. 6 is a schematic block diagram illustrating a functional structure of the printer order controller of FIG. 4.

FIG. 6 illustrates a functional block of the print order controller 131 according to an example embodiment of the present invention. The print order controller 131 includes a data storage 131-1, a data obtainer 131-2, a print speed determiner 131-3, and a controller 131-5. The data obtainer 131-2 receives an instruction for obtaining data from the controller 131-5, and sends a request for code information to the drawing data processor 120. The data obtainer 131-2 receives the job ID and the code information from the command status transfer 127 of the drawing data processor 120. The obtained job ID and the code information are buffered in the data storage 131-1. The data obtainer 131-2 sends notification indicating that obtaining of data is completed, to the controller 131-5.

The print speed determiner 131-3 receives an instruction for determining a print speed from the controller 131-5, and reads out the job ID and the code information from the data storage 131-1. The print speed determiner 131-3 refers to an LUT 131-7 (FIG. 7) to obtain a print speed using the code information, and stores the obtained print speed in the data storage 131-1 in association with the job ID. The print speed determiner 131-3 sends notification indicating that determination of the print speed is completed, to the controller 131-5. The print order controller 131 further includes a print order determiner 131-4, which receives an instruction for determining a print order from the controller 131-5. When the instruction is received, the print order determiner 131-4 obtains various parameters from the data storage 131-1, and determines a print order based on the print speed. The print order determiner 131-4 rearranges the job IDs, which are registered to a job queue, in the order either from the lowest to the highest or from the highest to the lowest of print speeds to determine a job sequence.

The controller 131-5 starts operation of sending the above-described instructions to a specific unit when an instruction for starting printing is received from the drawing data processor 120. At the time, the controller 131-5 may receive various parameters from the drawing data processor 120. For example, when notification is received, the controller 131-5 sends an instruction for obtaining code information, an instruction for outputting image data, or an instruction indicating a sheet transfer speed. The controller 131-5 receives notification indicating output process is completed, and sends notification indicating that output process is completed, to the drawing data processor 120.

Figure 7:
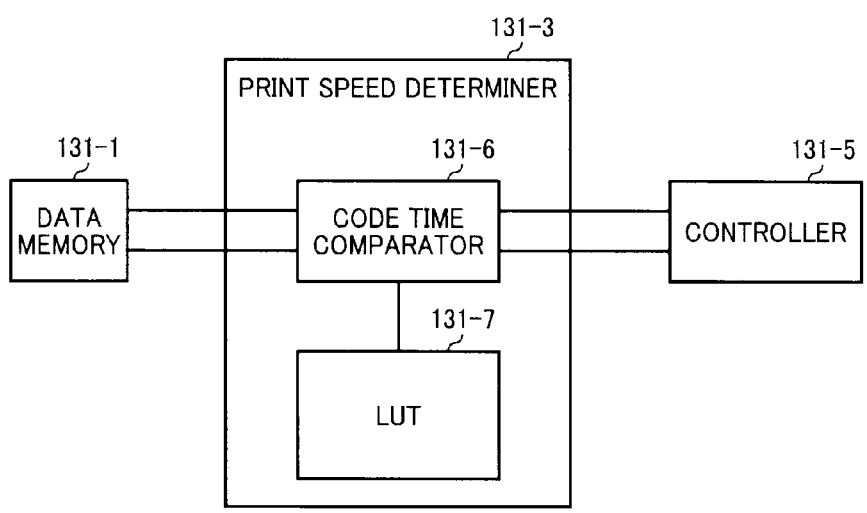
FIG. 7 is a schematic block diagram illustrating a functional structure of a print speed determiner of FIG. 6.

FIG. 7 illustrates a functional block of the print speed determiner 131-3 of the print order controller 131 of FIG. 6. More specifically, in this example, the print speed determiner 131-3 assumes that the predicted decode time is equal to the code time that is obtainable as the code information. The print speed determiner 131-3 includes a code time comparator 131-6. The code time comparator 131-6 obtains the code time and the job ID from the data storage 131-1, and compares the obtained code time with a print speed level that is stored in the LUT 131-7 to obtain a print speed level that is associated with the code time. The code time comparator 131-6 further assigns the obtained print speed level with the job ID, and registers the print speed level and the job ID to a job-speed table.

Figure 8:
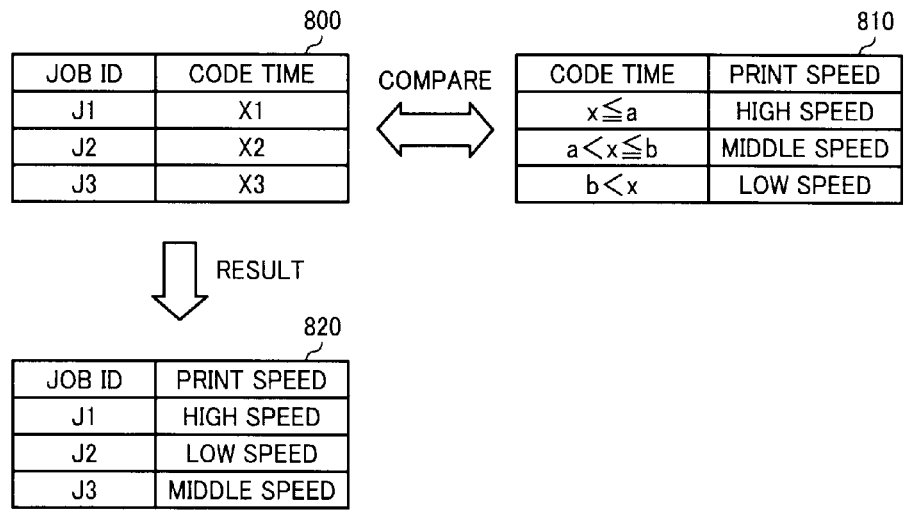
FIG. 8 is an illustration for explaining data stored in the print speed determiner of FIG. 6, according to an example embodiment of the present invention.

FIG. 8 illustrates an example data structure of the LUT 131-7 included in the print speed determiner 131-3. The print speed determiner 131-3 obtains the code time and the job ID from the data storage 131-1 to generate a table 800. The table 800 of FIG. 8 stores, for each one of a plurality of jobs, a job ID and code time required for coding image data to be processed.

The print speed determiner 131-3 refers to the table 810, which is an example of the LUT 131-7, to determine a print speed for each job ID. More specifically, the LUT 131-7 is previously provided with a table 810 that stores, for each level of print speeds, a range of code time. In this example, the table 810 indicates that the high speed is recommended for the code time that is equal to or less than "a", the middle speed is recommended for the code time that is greater than "a" but equal to or less than "b", and the low speed is recommended for the code time that is greater than "b". The print speed determiner 131-3 specifies a range in which the obtained code time is included, and obtains the print speed level that corresponds to the specified range of the obtained code time. The print speed determiner 131-3 further registers the determined print speed for each job ID in a print-speed table 820.

Figure 9:
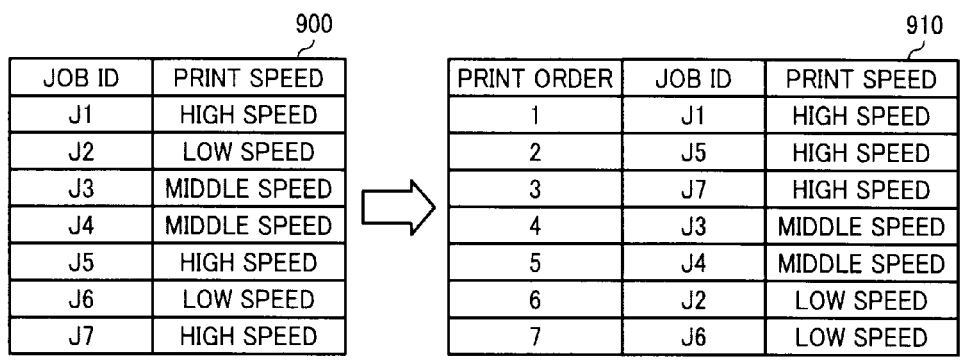
FIG. 9 is an illustration for explaining operation of determining a print order, performed by the print order determiner of FIG. 6, according to an example embodiment of the present invention.

FIG. 9 illustrates an example data structure of a table managed by the print order determiner 131-4. When the host PC 110 sends the print data to the drawing data processor 120, the drawing data processor 120 assigns a unique job ID to the print data, and causes the print order controller 131 to start operation of determining a job sequence. This job ID is sent to the print order determiner 131-4. The print order determiner 131-4 enters the received job ID to a job table 900 in the order that the job ID is received from the drawing data processor 120.

When the print speed determiner 131-3 determines a print speed for a specific job, the print order determiner 131-4 writes the print speed in a field corresponding to the job ID of the specific job to generate an entry in the job table 900. After the print order determiner 131-4 determines print speeds for all of the job IDs in the job table 900, the print order determiner 131-4 sorts the jobs in the order from the highest to the lowest of print speed level. In case of jobs having the same print speed levels, the jobs are sorted in the order from the lowest to the highest of job IDs. When the job sequence is determined, the print order determiner 131-4 assigns an index number to each job to indicate the order in which each job is processed. In this manner, a job sequence table 910 of FIG. 9 is generated.

For the descriptive purposes, in this example, it is assumed that the job sequence table 910 of FIG. 9 indicates a print order using Arabic numerals. The print order determiner 131-4 reads out a job ID in the order from the top to the bottom of entries in the job sequence table 910, and sends an instruction for sending raster data to the print engine 140 according to the job ID in this order. With this instruction, printing can be performed in the order from the highest to the lowest of print speeds. Alternatively, the printer order determiner 131-4 may send an instruction for sending raster data to the print engine 140 according to the job ID that is read out in the order from the bottom to the top of entries in the job sequence table 910. In such case, printing is performed in the order from the lowest to the highest of print speeds.

In another example, the print order determiner 131-4 may compare the print speed that is determined based on the code information with a current print speed level of the print engine 140 to generate a comparison result. When the comparison result indicates that they do not match, the print order determiner 131-4 may move an entry of the job assigned with the print speed that does not match with the current print speed to the last entry in the job sequence table 910. In such case, raster data that corresponds to the last entry of the job is processed after all jobs are processed.

The number of job IDs that can be stored in the job table 900 of FIG. 9 may be previously set to a predetermined number. Alternatively, the job table 900 of FIG. 9 may store a plurality of job IDs for a plurality of jobs that are registered for a predetermined time period counted from the time when a plurality of job IDs are stored for the last time. Further, in this example, the print controller 130 manages a remaining length of continuous roll paper, and determines a number of jobs to be processed based on the remaining length of continuous roll paper. This prevents paper to be run out in the middle of processing a print job, thus simplifying process including post processing process. The print controller 130 manages the job sequence table 910 until all entries of job are completed. Further, in this example, the jobs that are stored in the job sequence table 910 is exclusively managed. While the jobs in the job sequence table 910 are being performed, the print controller 130 continues to store a plurality of jobs in a job queue having a data structure that is similar to the job table 900. As a number of unprocessed jobs that are stored in the job sequence table 910 decreases, the print controller 130 initializes all entries of the print table 900, writes entries of the job queue into the job table 900, and sorts the print jobs in order. In this manner, the print controller 130 is able to instruct the drawing data processor 120 to continuously send data to be printed even when a number of print jobs are relatively large.

Further, in the above-described example, assuming that the print controller 130 sorts a first group of jobs stored in a job table 900 in the order from the highest to the lowest of print speeds, the print controller 130 sorts a second group of jobs that follow the first group of jobs and stored in an updated job table 900 in the order from the lowest to the highest of print speeds. By repeating this sequence of sorting the jobs in the order from the highest to the lowest, and in the order from the lowest to the highest, paper is transferred with improved efficiency, thus resulting in higher efficiency in printing operation.

Figure 10:
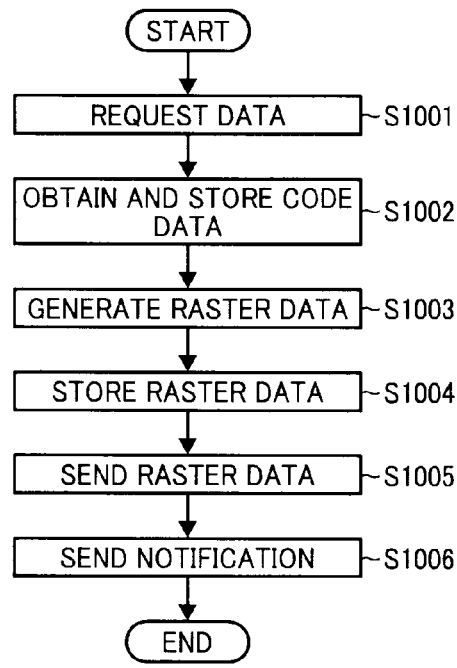
FIG. 10 is a flowchart illustrating operation of generating data to be printed, performed by the print controller of FIG. 4, according to an example embodiment of the present invention.

FIG. 10 is a flowchart illustrating operation of generating raster data, performed by the image data processors 132a to 132d, according to an example embodiment of the present invention. The operation of FIG. 10 is performed when an instruction for starting decoding is received. Since the image processors 132a to 132d are substantially similar in function and structure with one another except for a color of image data to be processed, the image processors 132a to 132d are collectively referred to as the image processor 132.

Figure 11:
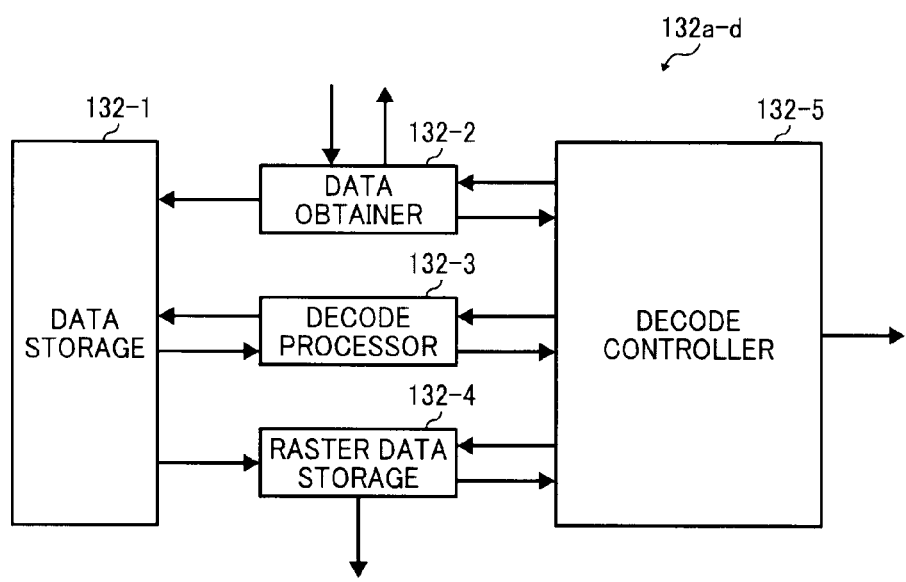
FIG. 11 is a schematic block diagram illustrating a functional structure of an image data processor of the print controller of FIG. 4.

At S1001, the image data processor 132 requests the drawing data processor 120 to send code data. At S1002, the image data processor 132 receives and stores the code data, and sends notification indicating that buffering of code data is completed to a decode processor 132-3 (FIG. 11). At S1003, the decode processor 132-3 obtains the code data for a specific color, and decodes the code data to generate uncompressed raster data of the specific color. At S1004, the decode processor stores the raster data, and sends notification indicating that buffering of raster data is completed to a decode controller 132-5 (FIG. 11).

At S1005, the decode processor 132-3 sends printing parameters such as a print speed to the print engine 140, and sends the rater data to the print engine 140. At S1006, the decode processor 132-3 sends notification indicating that the raster data is sent, to the decode controller 132-5, and the operation ends. Examples of printing parameters include, but not limited to, the print speed such as a sheet transfer speed that is determined based on the code information, and the time for applying ink.

FIG. 11 illustrates a functional block of the image data processors 132a to 132d included in the print controller 130. The image data processor 132 includes a data storage 132-1, a data obtainer 132-2, the decode processor 132-3, a raster data storage 132-4, and the decode controller 132-5. When the data obtainer 132-2 receives an instruction for starting decoding from the decode controller 132-5, the data obtainer 132-2 sends a request for sending code data to the drawing data processor 120. The data obtainer 132-2 obtains and stores the code data in the data storage 132-1, and sends notification indicating that buffering of code data is completed to the decode controller 132-5.

When the notification is received, the decode controller 132-5 instructs the decode processor 132-3 to obtain code data of a specific color from the data storage 132-1. The decode processor 132-3 decodes the code data of the specific color read out from the data storage 132-1, and stores the uncompressed raster data of the specific color in the data storage 132-1. This is repeated until all colors of code data are processed. Generally, the raster data includes the contents of a raster image generated by the drawing data processor 120. However, in this example, the raster data includes the contents of decoded data obtained by the print controller 130. After the raster data is stored, the decode processor 132-3 sends notification indicating that storage of the raster data is completed, to the decode controller 132-5. When notification is received, the decode controller 132-5 instructs the raster data storage 132-4 to obtain the raster data from the data storage 132-1.

The rater data storage 132-4 obtains the raster data from the data storage 132-1, and sends information regarding the print speed to the print engine 140. After confirming that the print engine 140 sets the print speed, the raster data storage 132-4 sends the raster data and notification indicating that sending of the raster data is completed to the decode controller 132-5. The print engine 140 prints an image based on the raster data onto continuous roll paper with a print speed that is set according to an instruction received from the raster data storage 132-4.

Figure 16:
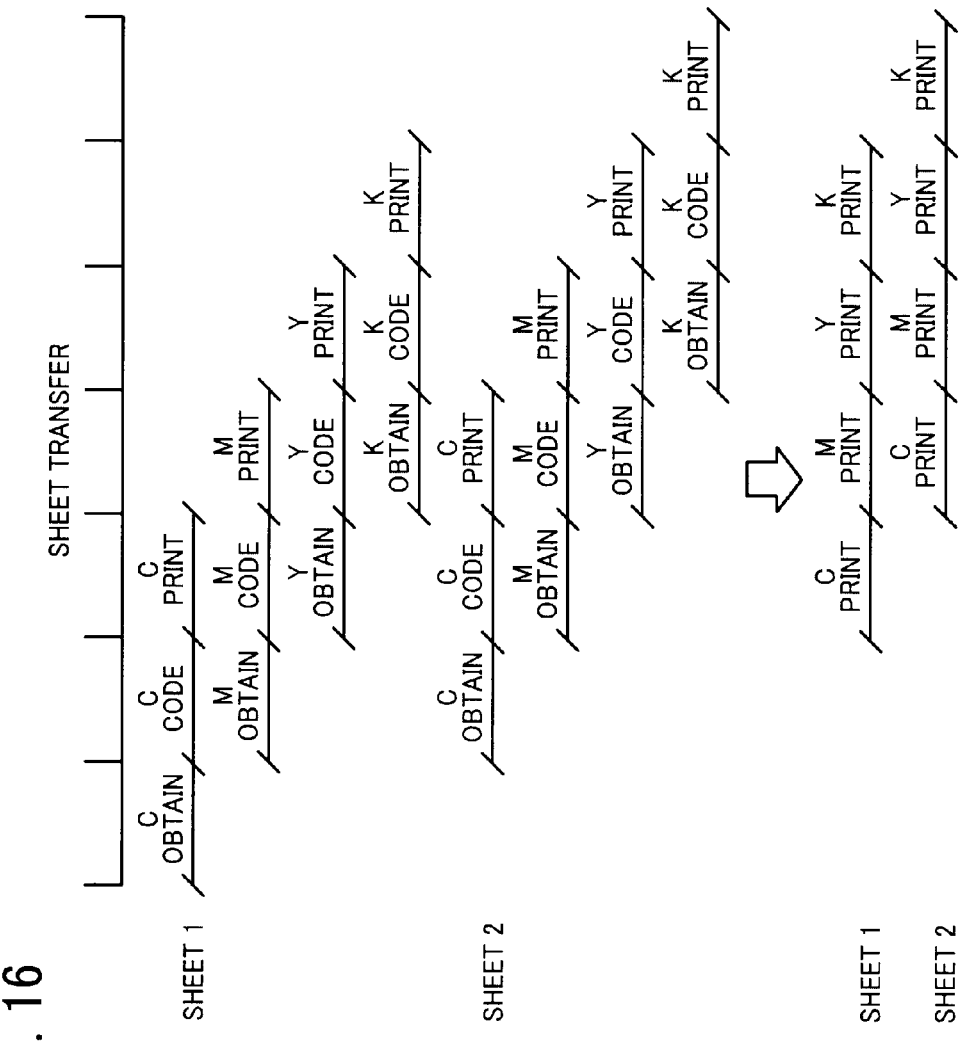
FIG. 16 is an illustration for explaining operation of sequentially printing images on continuous roll paper without performing a function of determining a print job sequence.

FIG. 16 illustrates example operation of sequentially printing images on continuous roll paper, using the print engine 140. In this example, process of obtaining code data, process of decoding code data, and process of printing raster data are each performed based on a unit of time that is equal to the time in which one-page length of continuous roll paper is transferred, as indicated by "SHEET TRANSFER" in FIG. 16. Further, a sequence of process of obtaining code data, process of decoding code data, and process of printing raster data is repeated for respective colors of image data for each page of paper as indicated by "SHEET 1" and "SHEET 2" in FIG. 16. Accordingly, two pages of full-composite image are formed. Further, in this example, it is assumed that there is no delay in process of obtaining, decoding, or printing.

More specifically, in the example illustrated in FIG. 16, when an instruction for starting printing of a sheet 1 is received, the print engine 140 obtains code data of cyan color ("C code data"), decodes the C code data to generate C raster data, and drives the head to print a C image of the C raster data on continuous roll paper to be output as the sheet 1. At the time when the C code data is being decoded, the print engine 140 obtains code data of magenta ("M code data"). At the time when the C raster data is printed, the print engine 140 decodes the M code data. This sequence of processes is repeated for all colors of image data to complete formation of color image on continuous roll paper to be output as the sheet 1. The print engine 140 further repeats a sequence of obtaining, decoding, and printing to complete formation of color image on continuous roll paper to be output as the sheet 2.

Figure 17:
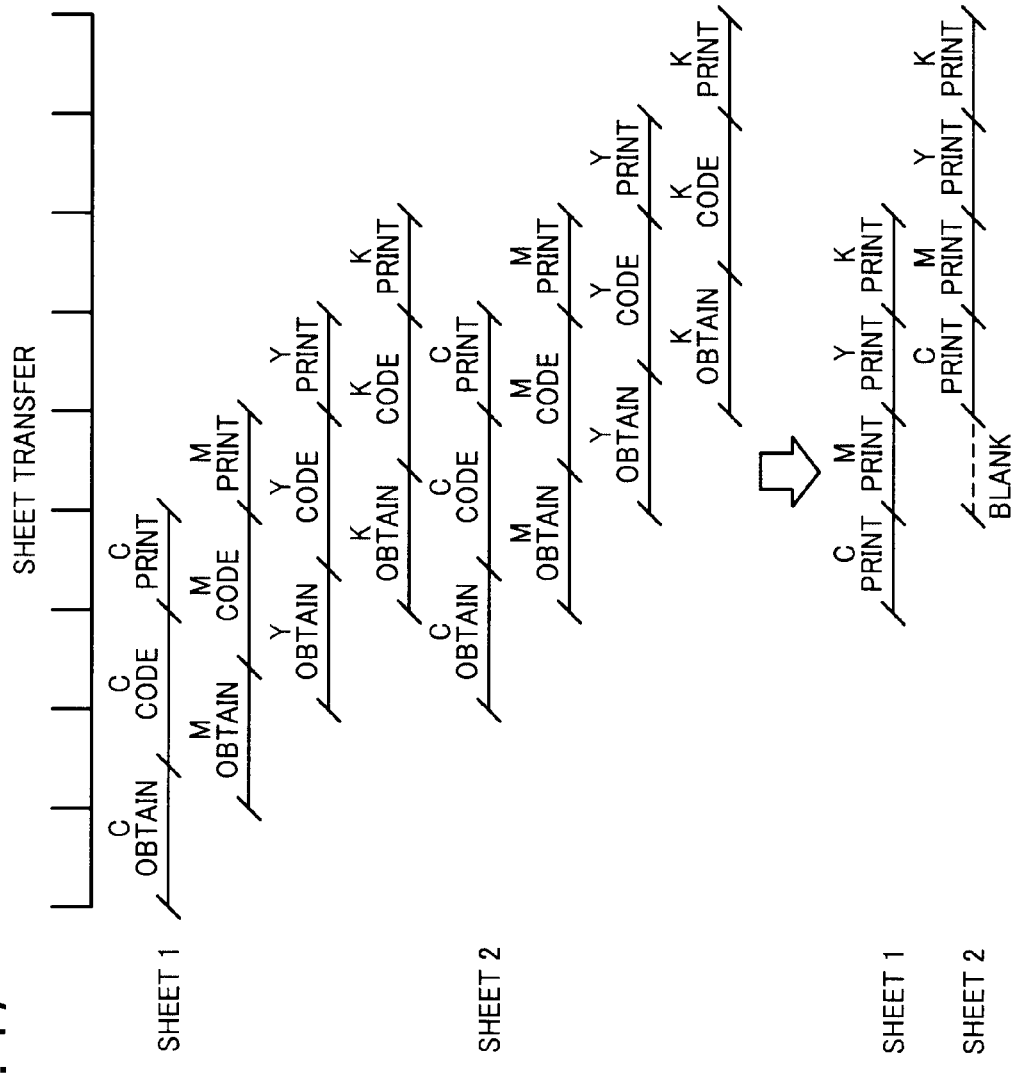
FIG. 17 is an illustration for explaining operation of sequentially printing images on continuous roll paper without performing a function of determining a print job sequence.

FIG. 17 illustrates example operation of sequentially printing images on continuous roll paper, using the print engine 140. In this example, it is assumed that process of decoding code data is delayed, and that the print system 100 does not perform the above-described operation of determining a job sequence. Further, in this example, data to be printed onto a sheet 2 requires more decoding time that the case of data to be printed onto a sheet 1.

Although more time for decoding is required for the sheet 2, the print system 100 is not able to start printing in the middle of a sheet transfer length. For example, after decoding C code data for the second sheet 2, the print system 100 stores the decoded C data in a buffer, and starts printing C raster image at a next timing according to the sheet transfer length. This results in a blank portion of paper as illustrated in FIG. 17 since continuous roll paper is continuously transferred even when there is delay in image formation, thus one-page space of paper is wasted. In order to prevent paper to be wasted, the print system 100 may be able to lower the transfer rate of paper when delay in processing is detected. However, this may cause the continuous roll paper to be loose such that the head may be degraded due to paper dust or a paper transfer error may occur.

Figure 12:
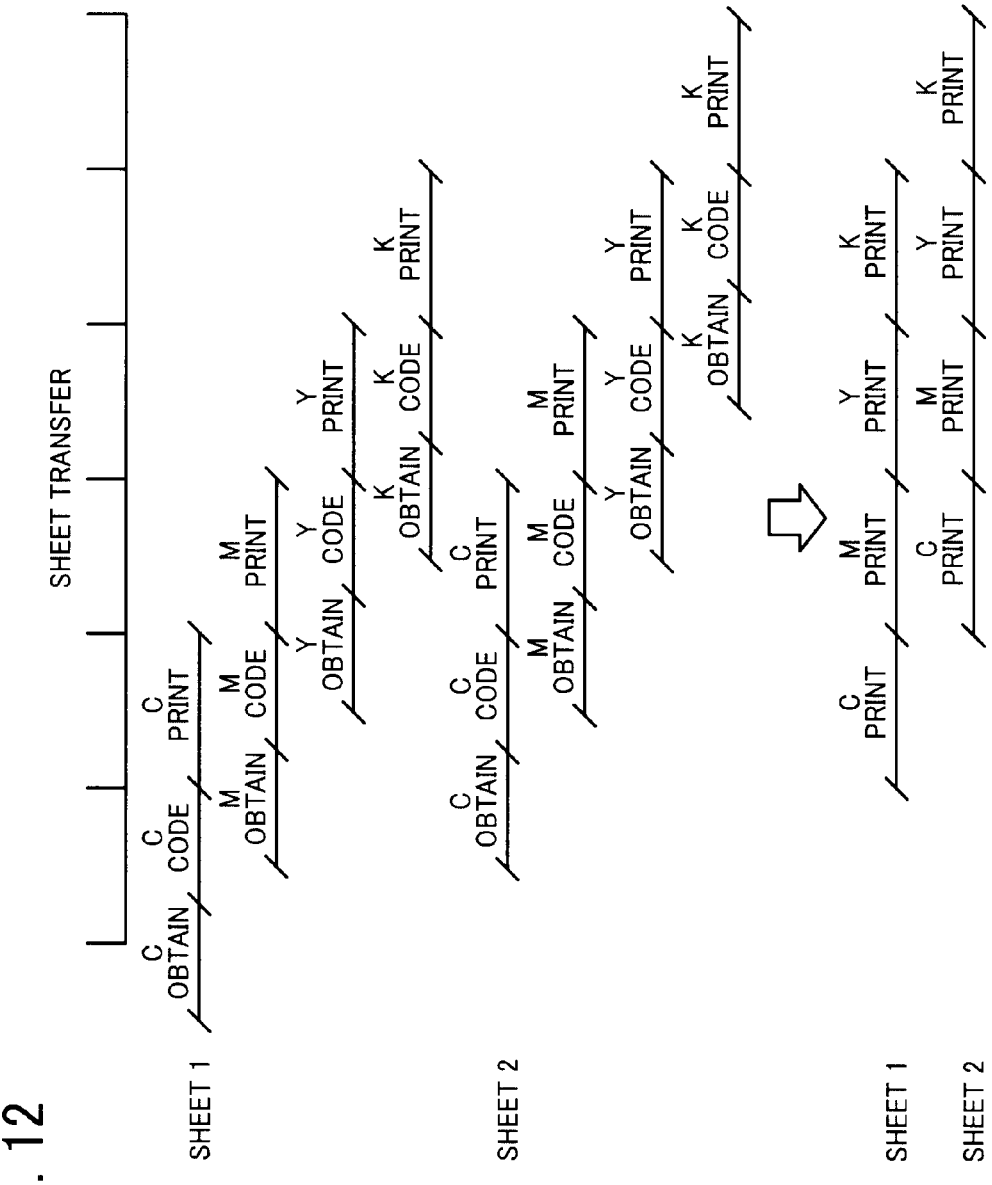
FIG. 12 is an illustration for explaining operation of printing images on continuous roll paper, performed by the printing system of FIG. 1.

FIG. 12 illustrates operation of sequentially printing images on continuous roll paper according to an example embodiment of the present invention, using the function of determining a job sequence. More specifically, in this example, a time period required for transferring one page length of continuous roll paper ("TRANSFER SHEET") is made variable such that the print speed is lowered according to the predicted decode time of code data.

Further, as illustrated in lower portion of FIG. 12, the color image to be output as the sheet 1 and the color image to be output as the sheet 2 are printed with the same print speed levels such that a blank portion of continuous roll paper would not be generated.

For example, assuming that the color image to be output as sheet 1 and the color image to be output as sheet 2 are included as one print job, these two images are printed with the same print levels as the print system 100 prints each job assigned with the specific job ID with the same print speed levels. Alternatively, in case of printing images of different jobs assigned with different job IDs, the job sequence table 910 is updated such that the jobs having the same print speed level are processed at the same times. This greatly reduces a time required for changing the settings of print speeds, thus improving efficiency in printing processing.

FIG. 13A illustrates how the print speed of the print engine 140 changes while sequentially performing a plurality of jobs, when the print system 100 does not perform the above-described function of determining a print job sequence. FIG. 14 illustrates how the print speed of the print engine 140 changes while sequentially performing a plurality of jobs, when the print system 100 does perform the above-described function of determining a print job sequence.

More specifically, the graph 1300 of FIG. 13A indicates the change in sheet transfer speed of the print engine 140 with respect to time, when the function of determining a print job sequence is not performed. The graph 1310 of FIG. 13B indicates the change in sheet transfer speed of the print engine 140 with respect to time, when the function of determining a print job sequence is performed. In FIG. 13A, "HIGH" refers to high level print speeds, "MIDDLE" indicates middle level print speeds, and "LOW" indicates low level print speeds.

Referring to FIG. 13A, when jobs are processed in the order that the print job is received, a slope portion of the graph 1300 indicated by the dashed lines is relatively large in comparison with a flat portion of the graph 1300 indicated by the solid line. This represents that, when the print speeds are frequently changed, the time for setting the print speeds tends to be long in comparison with the time for printing such that the overall processing time required for completing printing operation would be longer.

Further, during the time for setting the print speeds, the print system 100 retains data to be processed, such as print data or code data to be decoded, in its memory space. As the time for setting the print speeds increases, more memory space is generally needed such that the overall manufacturing cost may increase.

Referring to FIG. 13B, when jobs are processed in the order that is determined based on the predicted decode time, such as based on the print speed level determined by the predicted decode time, a slope portion of the graph 1310 indicated by the dashed lines is relatively small in comparison with a flat portion of the graph 1310 indicated by the solid line. This indicates that a number of times the print speeds are changed is greatly reduced such that there is more time for printing, thus improvising efficiency in printing processing.

Figure 15:
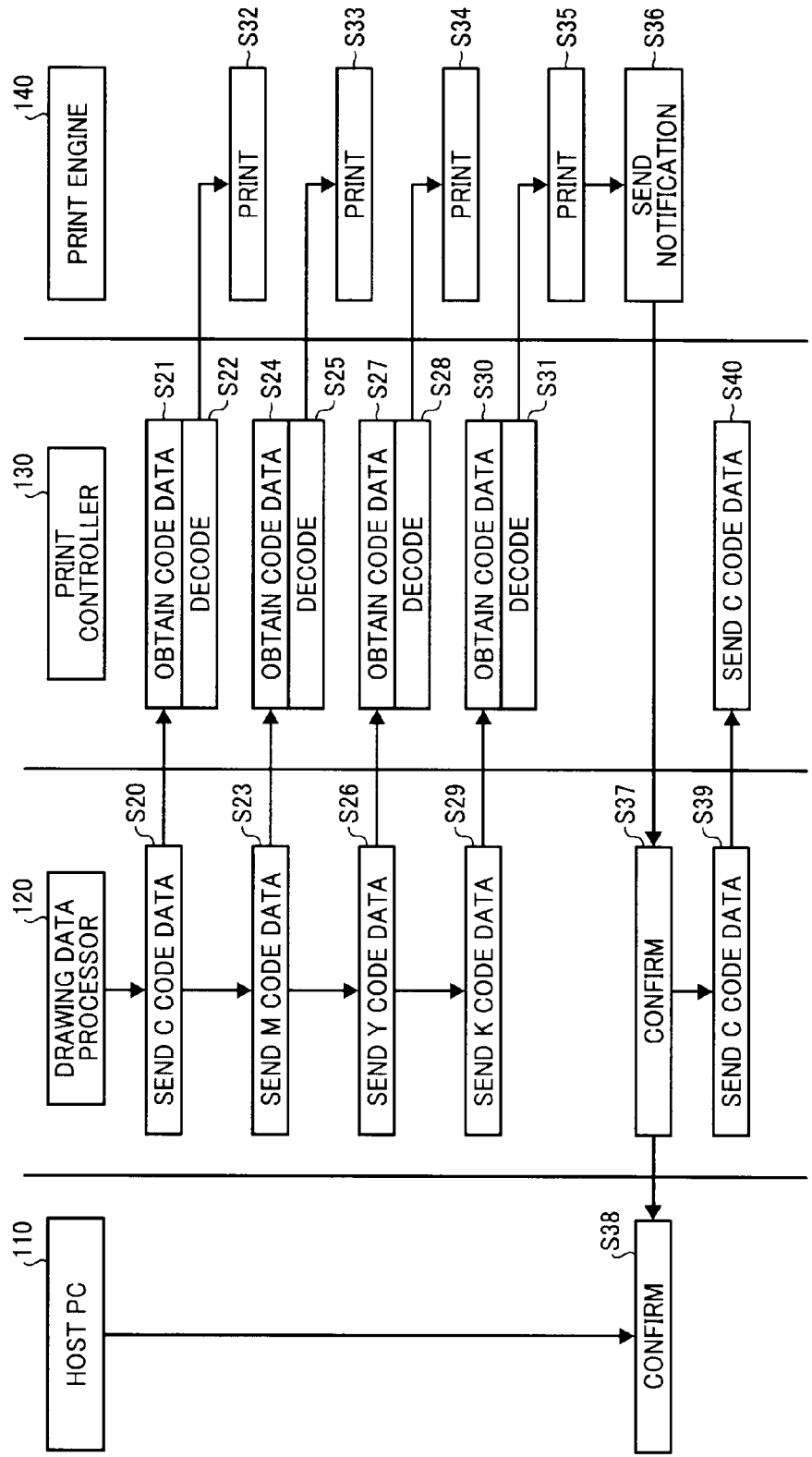

FIGS. 14 and 15 are a data sequence diagram illustrating operation of printing image data, performed by the print system 100, according to an example embodiment of the present invention.

At S1, the host PC 110 sends the print data to the drawing data processor 120. At S2, the drawing data processor 120 assigns a job ID to the print data. At S3, the drawing data processor 120 deploys the print data to generate raster data. At S4, the drawing data processor 120 sends the raster data to the encoder 125 to encode the raster data. After completion of encoding, at S5, the drawing data processor 120 instructs the print controller 130 to start printing. At S6, the drawing data processor 120 sends the code information and various parameters, in association with the job ID, to the print controller 130.

At S7, when the print controller 130 receives the code information, the print controller 130 determines a print speed for each job using the code information. At S8, the print controller 130 determines an order of outputting jobs based on the determined print speeds. At S9, the print controller 130 sends various parameters to the print engine 140 to cause the print engine 140 to set parameters. The parameters include a parameter for setting a print speed to the determined print speed level. At S10, the print engine 140 sets the parameters, and sends notification indicating that setting of parameters is completed to the print controller 130. At S11, the print controller 130 receives the notification. At S12, the print controller 130 requests the drawing data processor 120 to send code data, and the operation ends to proceed to operation of FIG. 15.

At S20, the drawing data processor 120 sends code data of a cyan color ("C code data") to the print controller 130. At S21, the print controller 130 obtains the C code data. At S22, the print controller 130 decodes the C code data to generate C raster data, and sends the C raster data to the print engine 140 to cause the print engine 140 to start printing a cyan image based on the C raster data. In this example, the C code data that is sent by the print controller 130 at S20 is obtained using a job ID that is stored in the job sequence table 910 managed by the print controller 130. More specifically, the print controller 130 processes the jobs in the order from the highest to the lowest, or from the lowest to the highest, to print raster data according to this order.

S23 to S25 are performed in a substantially similar manner as described above referring to S20 to 22 except that the code data of a magenta color is subjected for processing.

S26 to S28 are performed in a substantially similar manner as described above referring to S20 to 22 except that the code data of an yellow color is subjected for processing.

S29 to S31 are performed in a substantially similar manner as described above referring to S20 to 22 except that the code data of a black color is subjected for processing.

At S32, S33, S34, and S35, the print engine 140 prints images of respective colors based on the raster data received from the print controller 130. At S36, when printing of the raster data for one page of data is completed, the print engine 140 sends notification to the drawing data processor 120 and the host PC 110.

At S37, the drawing data processor 120 receives the notification indicating that printing is completed. At S39, the drawing data processor 120 sends code data of a next page using the same job ID to the print controller 130 to cause the print controller 130 and the print engine 140 to perform operation as described above referring to S21 to S36.

When the printer controller 130 determines that all pages of data for the selected job are processed, the print controller 130 requests the drawing data processor 120 to send C code data of a next job to be processed using a next job ID. This operation is repeated until all jobs in the job sequence table 910 are processed.

As described above, the print system 100 is able to print images on continuous roll paper, with improved efficiency in printing processing. Since the print system 100 is able to continuously print images on continuous roll paper without generating a blank portion, continuous roll paper is not wasted.

For example, in the above-described example of forming an image on continuous roll paper using the ink-jet method, once roll paper is installed onto the sheet feeding device 142, the sheet feeding device 142 continuously conveys the roll paper in the sheet transfer direction toward the print engine 140 for image formation. Further, a distance between an ink disposer of the head and paper is made small to increase the printing speeds. In such case, if roll paper is stopped, roll paper is made loose such that the surface of roll paper may be made in contact with the ink disposer, causing the ink disposer to be degraded. The degraded ink disposer may further cause an error in printing operation such as nozzle clogging or degradation in image quality. Further, in order to stop transfer of paper, the print system 100 requires the time for lowering the transfer speeds. Further, in order to resume transfer of paper, the print system 100 requires the time for increasing the transfer speeds. Accordingly, the overall time required for printing images greatly increases.

On the other hand, the print system 100 may be caused to continuously keep transferring roll paper even when there is delay in processing. In such case, however, as described above referring to FIG. 17, a blank portion of roll paper is generated such that paper is wasted. Further, more memory space is needed to store data to be processed.

In alternative to printing an image on roll paper using ink-jet method, the present invention may be applied to an image forming apparatus that forms an image on cut paper using electrophotographic method.

While the image forming apparatus that forms an image on cut paper may be caused to stop transfer of paper more easily, at least a portion of the image forming apparatus requires electrical power. For example, the fixing temperature of a fixing device may need to be kept at a predetermined temperature even when transfer of paper is stopped. Further, in order to control operation of sheet transfer as well as print speeds, a controller having more complex structure may be needed.

Accordingly, with the above-described function of determining a print job sequence based on the code information, the image forming apparatus is able to process a plurality of print jobs with improved efficiency in terms of time and energy consumption.

As described above, the print system of the above-described examples obtains the predicted decode time required for decoding code data from code information regarding the coding process of code data, and determines a print speed based on the predicted decode time.

Further, the print system 100 determines a job sequence indicating an order of processing jobs based on either the predicted decode time or the print speed to generate a job sequence table. The print system 100 prints an image according to the determined job sequence. This prevents generation of a blank portion of roll paper when printing an image on roll paper, thus preventing paper to be wasted, thus improving efficiency in printing processing. This further helps the hardware resource to be used more efficiently, thus improving the efficiency in printing processing.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

For example, in the above-described examples, the print controller 130 determines a print job sequence of a plurality of jobs after the print controller 130 calculates a print speed for each one of the plurality of jobs to be processed. Alternatively, when the print controller 130 receives a request for performing a print job to print an image, the print controller 130 may obtain a print job speed of the requested job using code information, compare the obtained print job speed with a current print speed that is set at the printer engine 140, and determine whether to perform the requested job with the current print speed. This may further improve the efficiency in printing processing, for example, when the print controller 130 receives a request for performing the print job while the print engine 140 is performing a print job that is previously received. More specifically, in such case, the print controller 130 obtains a print speed level that is currently set at the print engine 140, and sorts one or more print jobs that are queued such that one or more print jobs to be printed with the current speed level are arranged at the top of the table. Accordingly, the print controller 130 instructs the print engine 140 to change the print speed level only after the print engine 140 completes printing of all images that are to be printed with the current speed level.

Further, the printing system 100 of FIGS. 1A and 1B may be implemented in various other ways. For example, the print controller 130 may be incorporated into an information processing apparatus that is provided separately from an image forming apparatus having the print engine 140 therein. In such case, the print controller 130 sends a print job sequence table to the print engine 140 to cause the print engine 140 to perform printing according to the print job sequence table.

Further, in an alternative to requesting the drawing data processor 120 for code data for processing, the print controller 130 or the print engine 140 may obtain the code data from a storage device that may be provided separately from the drawing data processor 120. For example, the drawing data processor 120 may store the code data for processing in the storage device, such as a document server. When the print system 100 receives a user instruction for printing the code data for a plurality of print jobs, the print system 100 may determine a print job sequence of the plurality of print jobs, and causes the print engine 140 to obtain the code data from the storage device in the order specified by the print job sequence.

Further, in the above-described examples, the job ID is assigned to the code data as well as the code information. The job ID may be any desired identification information that may be expressed in any character, numeral, symbol, or any combination of character, numeral and symbol.

Further, in the above-described examples, the drawing data processor 120 assigns the job ID to the code data. Alternatively, the drawing data processor 120 may send a request for starting printing of code data to the print controller 130, and receives a job ID that is assigned to the code data by the print controller 130 from the print controller 130 in response to the request. The drawing data processor 120 sends the code information with the job ID that is assigned to the print controller 130. Further, when the print controller 130 determines a print job sequence using the code information received from the drawing data processor 120, the print controller 130 may send information regarding the print job sequence to the drawing data processor 120. In this manner, the drawing data processor 120 is able to send the code data, with the job ID, by the order specified by the print job sequence.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

For example, the computer program may be written in any desired programming language such as legacy programming language or object-oriented programming language including, for example, assembler, C++, Java, JavaScript, Perl, and Ruby. Further, the computer program may be stored in any desired recording medium such as a hard disk drive, CD-ROM, MO, flexible disk, EEPROM, and EPROM, for distribution. Alternatively, the computer program may be distributed through a network in any desired format that is interpretable by an apparatus on the network such as general-purpose computer.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in a print system including image deploy means; print control means, and print engine means. The image deploy means receives print data from a host, converts the print data to raster data, encodes the raster data to generate code data, and assigns a specific job ID to the code data. The print control means obtains code information indicating work load in generating the code data by the image deploy means, determines a print speed level to be used for printing the raster data, and rearranges an order of job IDs according to the print speed level to generate a job sequence table for specifying an order of processing jobs. The print engine means prints an image of the raster data in the order specified by the job sequence table with a print speed that is determined by the print control means.

In another example, the print system further includes a table that stores the job ID and the print speed level in association with each other. The print control means compares a predicted decode time obtained from a code time included in the code information with a range of predicted decode time values that is previously made in association with a print speed level to determine the print speed level that corresponds to the job ID, and sorts the job IDs in the table by the print speed level to re-arrange the order of processing the job IDs.

In another example, the print control means includes: data obtaining means for obtaining the job ID generated by the image deploying means and the code information; means for determining the print speed level that corresponds to the predicted decode time obtained using the code information; and means for determining a print order of the jobs by sorting the job IDs to be printed that are registered in the table by the determined print speed level.

In another example, the code information includes at least the code time required for generating code data and the job ID. The print control means determines the predicted decode time as a function of the code time, and refers to a lookup table that associates the predicted decode time and the print speed level range to determine the print speed level that corresponds to the job ID.

In another example, the job sequence table stores the job ID and the print speed level for a predetermined number of jobs, and causes the stored jobs to be processed in selected one of a preceding order and a descending order in the sequence table. When print control of the jobs stored in the job sequence table is completed, the job sequence table is updated to store a set of jobs to be processed next, and causes the stored jobs to be processed in the unselected one of the preceding order and the descending order in the sequence table.

In any one of the above-described examples, the print engine means forms an image using an ink-jet method or an electro photographic method.

What is claimed is:

1. An image forming system, comprising:
  a drawing data processor to encode image data to be printed to generate code data and code information regarding encoding processing or the code data, for each one of a plurality of print jobs;
  a memory to store, for each one of the plurality of print jobs, the code information to which job identification is assigned;
  a print controller to:
    calculate, for each one of the plurality of print jobs, a predicted decode time that is predicted to be required for decoding the code data into decoded data using the code information;
    determine, for each one of the plurality of print jobs, a print speed level at which the decoded data is to be printed using the predicted decode time; and
    re-arrange an order of the plurality of print jobs stored in the memory by the print speed level to generate a print job sequence table in the memory, the print job sequence table specifying an order of processing the plurality of print jobs and the print speed level for each one of the plurality of print jobs; and
  a print engine to process the plurality of jobs in the order specified by the print job sequence table to form an image of the decoded data with the print speed level specified by the print job sequence table, wherein:
  the print job sequence table stores, for each one of the plurality of print jobs, the job identification information and the print speed level in the order determined by the print speed level;
  the print controller requests the drawing data processor to send the code data in the order determined by the print speed level using the job identification information stored in the print job sequence table;
  the memory stores correspondence information indicating the correspondence between a range of predicted decode time and a print speed level that is recommended for printing decode data;
  the print controller is further configured to determine the print speed level using the correspondence information, and to generate a table in the memory to store the determined print speed level in association with the job identification for each one of the plurality of print jobs;
  the print controller stores a predetermined number of print jobs in the table as a first set of print jobs, sorts the first set of print jobs, and enters the sorted first set of print jobs into the print job sequence table;
  when the print controller determines that controlling processing of the sorted first set of print jobs stored in the print job sequence table is completed, the print controller sorts a second set of print jobs having the predetermined numbers stored in the table, and updates the print job sequence table with the sorted second set of print jobs;
  the print controller sorts the first set of print jobs in the table in a selected one of preceding order and descending order of the print speed level; and
  the print controller sorts the second set of print jobs in the unselected one of preceding order and descending order of the print speed level.

2. The image forming system of claim 1, wherein:
  the code information includes a code time required for encoding the image data to generate the code data, and
  the print controller is configured to set the predicted decode time to be equal to the code time included in the code information.

3. The image forming system of claim 2, wherein:
  the print engine forms the image of the decoded data on continuous roll paper.

4. The image forming system of claim 3, wherein:
  the print engine forms the image of the decoded data using ink-jet method.

5. A method of controlling an image forming system, the method comprising:
  encoding image data to be printed to generate code data and code information regarding encoding processing or the code data;
  assigning job identification to the code information, for each one of a plurality of print fobs;
  storing, in a memory, the code information to which the job identification is assigned for each one of the plurality of print jobs;
  calculating, for each one of the plurality of print jobs, a predicted decode time that is predicted to be required for decoding the code data into decoded data using the code information;
  determining, for each one of the plurality of print jobs, a print speed level at which the decoded data is to be printed using the predicted decode time;
  re-arranging an order of the plurality of print jobs stored in the memory by the print speed level to generate a print job sequence table in the memory, the print job sequence table specifying an order of processing the plurality of print jobs and the print speed level for each one of the plurality of print jobs; and
  processing the plurality of jobs in the order specified by the print job sequence table to form an image of the decoded data with the print speed level specified by the print job sequence table, the method further including
  storing, in the print job sequence table, the job identification information and the print speed level in the order determined by the print speed level for each one of the plurality of print jobs;
  sending the code data in the order determined by the print speed level using the job identification information stored in the print job sequence table;
  storing, in the memory, correspondence information indicating the correspondence between a range of predicted decode time and a print speed level that is recommended for printing decode data;
  determining the print speed level using the correspondence information;
  generating a table in the memory to store the determined print speed level in association with the job identification for each one of the plurality of print jobs;

storing a predetermined number of print jobs in the table as a first set of print jobs;

sorting the first set of print jobs;

entering the sorted first set of print jobs into the print job sequence table, when controlling processing of the sorted first set of print jobs stored in the print job sequence table is determined to be completed, performing the steps of:

sorting a second set of print jobs having the predetermined numbers stored in the table; and updating the print job sequence table with the sorted second set of print jobs;

sorting the first set of print jobs in the table in a selected one of preceding order and descending order of the print speed level; and sorting the second set of print jobs in the unselected one of preceding order and descending order of the print speed level.

6. The method of claim 5, further comprising:

setting the predicted decode time to be equal to a code time included in the code information, the code time indicating a time required for encoding the image data to generate the code data.

7. A non-transitory recording medium storing a plurality of instructions which cause, when executed by a processor, the processor to perform a method of controlling an image forming system, the method comprising:

encoding image data to be printed to generate code data and code information regarding encoding processing or the code data;

assigning job identification to the code information, for each one of a plurality of print jobs;

storing, in a memory, the code information to which the job identification is assigned for each one of the plurality of print jobs;

calculating, for each one of the plurality of print jobs, a predicted decode time that is predicted to be required for decoding the code data into decoded data using the code information;

determining, for each one of the plurality of print jobs, a print speed level at which the decoded data is to be printed using the predicted decode time;

re-arranging an order of the plurality of print jobs stored in the memory by the print speed level to generate a print job sequence table in the memory, the print job sequence table specifying an order of processing the plurality of print jobs and the print speed level for each one of the plurality of print jobs; and processing the plurality of jobs in the order specified by the print job sequence table to form an image of the decoded data with the print speed level specified by the print job sequence table, the method further including storing, in the print job sequence table, the job identification information and the print speed level in the order determined by the print speed level for each one of the plurality of print jobs;

sending the code data in the order determined by the print speed level using the job identification information stored in the print job sequence table;

storing, in the memory, correspondence information indicating the correspondence between a range of predicted decode time and a print speed level that is recommended for printing decode data;

determining the print speed level using the correspondence information;

generating a table in the memory to store the determined print speed level in association with the job identification for each one of the plurality of print jobs;

storing a predetermined number of print jobs in the table as a first set of print jobs;

sorting the first set of print jobs;

entering the sorted first set of print jobs into the print job sequence table;

when controlling processing of the sorted first set of print jobs stored in the print job sequence table is determined to be completed, performing the steps of:

sorting a second set of print jobs having the predetermined numbers stored in the table; and updating the print job sequence table with the sorted second set of print jobs;

sorting the first set of print jobs in the table in a selected one of preceding order and descending order of the print speed level; and sorting the second set of print jobs in the unselected one of preceding order and descending order of the print speed level.

* * * * *